(12) United States Patent
Cheng et al.

(10) Patent No.: US 10,025,744 B2
(45) Date of Patent: *Jul. 17, 2018

(54) SOLID STATE DISK

(71) Applicant: ALSON TECHNOLOGY LIMITED, Kowloon (HK)

(72) Inventors: Wei-Di Cheng, Zhubei (TW); Han-Hung Cheng, Zhubei (TW)

(73) Assignee: ALSON TECHNOLOGY LIMITED, Kowloon (HK)

( * ) Notice: Subject to any disclaimer, the term of this patent is extended or adjusted under 35 U.S.C. 154(b) by 334 days.

This patent is subject to a terminal disclaimer.

(21) Appl. No.: 14/928,835

(22) Filed: Oct. 30, 2015

(65) Prior Publication Data

US 2017/0124015 A1 May 4, 2017

(51) Int. Cl.
*G06F 1/18* (2006.01)
*G06F 13/40* (2006.01)
*F21V 8/00* (2006.01)

(52) U.S. Cl.
CPC ....... *G06F 13/4081* (2013.01); *G02B 6/0043* (2013.01)

(58) Field of Classification Search
CPC .................. G02B 6/0043; G06F 13/14081
See application file for complete search history.

(56) References Cited

U.S. PATENT DOCUMENTS

| | | | | |
|---|---|---|---|---|
| 6,731,499 B2 * | 5/2004 | Jeng | ........................ | G06F 1/181 |
| | | | | 361/679.22 |
| 9,720,457 B1 * | 8/2017 | Cheng | ..................... | G06F 1/181 |
| 9,797,558 B2 * | 10/2017 | Kerr | .......................... | F21S 2/00 |
| 2011/0065480 A1 * | 3/2011 | Kim | ................... | H04N 13/0406 |
| | | | | 455/566 |

FOREIGN PATENT DOCUMENTS

TW          M508102          9/2015

* cited by examiner

*Primary Examiner* — Anabel Ton
(74) *Attorney, Agent, or Firm* — Muncy, Geissler, Olds & Lowe, P.C.

(57) ABSTRACT

A solid state disk is provided, including: a main body, a light-emitting module and a light-guiding portion. The main body includes a shell portion, a substrate disposed in the shell portion and a memory module disposed on the substrate. The substrate further has a transmit port electrically connected with the memory module. The light-emitting module has a board disposed on the main body and a light-emitting portion disposed on the board. The light-guiding portion is disposed corresponding to the light-emitting portion. At least partial light from the light-emitting portion is transmitted outside the solid state disk through the light-guiding portion.

10 Claims, 6 Drawing Sheets

US 10,025,744 B2

SOLID STATE DISK

BACKGROUND OF THE INVENTION

Field of the Invention

The present invention relates to a solid state disk (SSD).

Description of the Prior Art

A conventional solid state disk as disclosed in TWM508102 has a substrate, a memory module, at least one light-emitting portion and at least one light-guiding portion. The substrate further has a transmit port. The memory module is disposed on the substrate. The memory module is electrically connected with the light-emitting portion. The at least one light-guiding portion at least partially covers the at least one light-emitting portion.

However, in actual practice, the light-emitting portion, the substrate and the memory module are connected together. Therefore, if the light-emitting portion is broken, the substrate and the memory module both must be replaced. The cost of replacement is considerably high.

The present invention has arisen to mitigate and/or obviate the afore-described disadvantages.

SUMMARY OF THE INVENTION

The major object of the present invention is to provide a solid state disk which has a light-emitting portion disposed on another board. When the light-emitting portion malfunctions, it requires only to replace the board which the light-emitting portion disposed thereon. The cost of replacement is much lower.

Furthermore, the board is able to provide a heat-dissipating area to prevent the substrate from being broken.

To achieve the above and other objects, a solid state disk is provided, including: a main body, a light-emitting module and a light-guiding portion. The main body includes a shell portion, a substrate disposed in the shell portion and a memory module disposed on the substrate. The substrate further has a transmit port electrically connected with the memory module. The light-emitting module has a board disposed on the main body and a light-emitting portion disposed on the board. The light-guiding portion is disposed corresponding to the light-emitting portion. At least partial light from the light-emitting portion is transmitted outside the solid state disk through the light-guiding portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
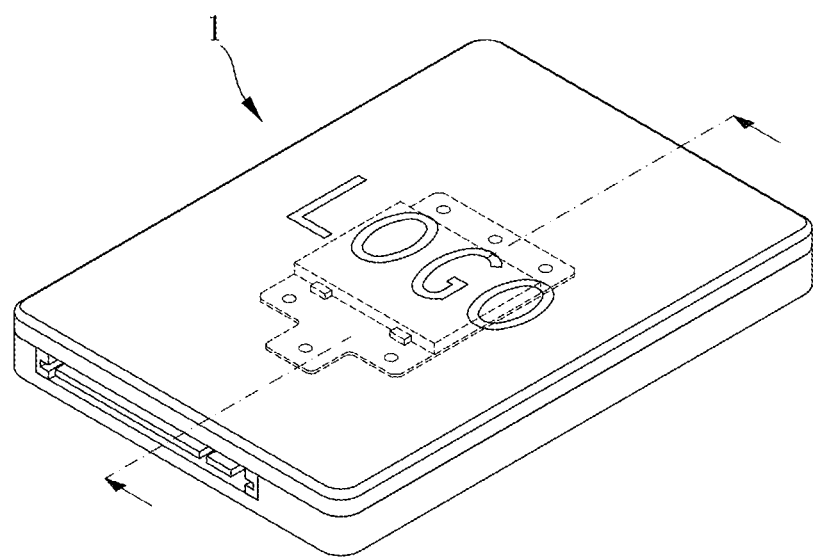
FIG. 1 is a perspective drawing of a first preferred embodiment of the present invention.
Figure 2:
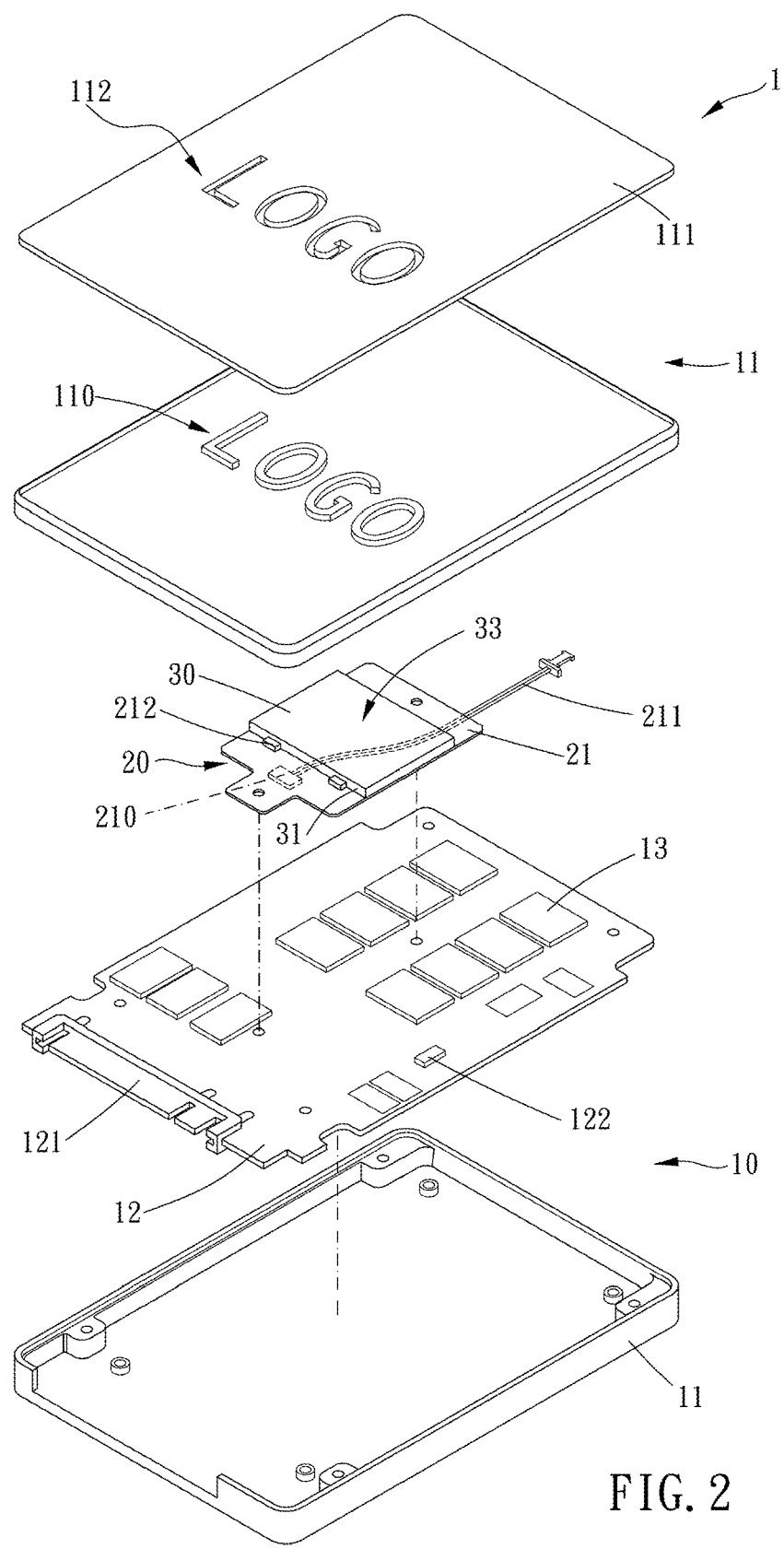
FIG. 2 is a breakdown drawing of the first preferred embodiment of the present invention.
Figure 3:
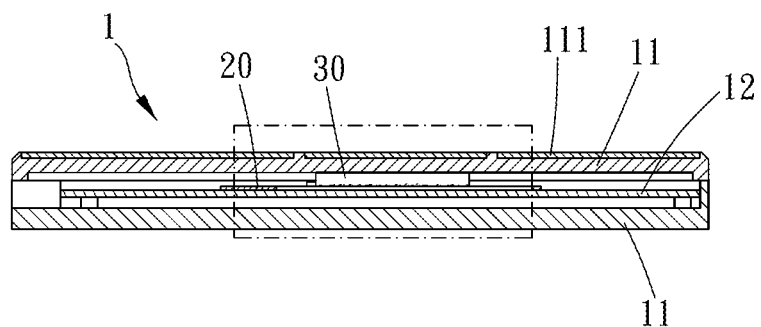
FIG. 3 is a cross-sectional drawing of the FIG. 1 of the present invention.

The present invention will be clearer from the following description when viewed together with the accompanying drawings, which show, for purpose of illustrations only, the preferred embodiment in accordance with the present invention.

Please refer to FIGS. 1 to 4 for a preferred embodiment of a solid state disk 1 of the present invention. The solid state disk 1 includes a main body 10, a light-emitting module 20 and a light-guiding portion 30.

The main body 10 includes a shell portion 11, a substrate 12 disposed in the shell portion 11 and a memory module 13 disposed on the substrate 12. The substrate 12 further has a transmit port 121 electrically connected with the memory module13. More specifically, the transmit port 121 is able to transmit not only electric power but data.

The light-emitting module 20 has a board 21 disposed on the main body 10 and a light-emitting portion 212 disposed on the board 21. Furthermore, the board 21 may be disposed on at least one of the shell portion and the substrate. Therefore, when the light-emitting portion 212 malfunctions, only the board 21 needs to be replaced. Additionally, the board 21 may keep an appropriate distance from the substrate 12 to improve heat-dissipating efficiency. Furthermore, the substrate 12 includes a first electrical slot 122 electrically connected with the transmit port 121. The board 21 includes a second electrical slot 210 electrically connected with the light-emitting portion 212. The first and second electrical slots 122,210 are electrically connected through two ends of an electrical flat cable 211 being electrically plugged thereto respectively, so that the light-emitting portion 212 can be electrically connected with the transmit port 121. In other embodiment, the board may be electrically connected with the substrate through welding, or electrically connected with another external power supply (such as computer main board).

The light-guiding portion 30 is disposed corresponding to the light-emitting portion 212, and at least partial light from the light-emitting portion 212 is transmitted outside the solid state disk 1 through the light-guiding portion 30. In this embodiment, the light-guiding portion 30 has a scattering structure 320. The light from the light-emitting portion 212 is partially projected onto the scattering structure 320, scattered by the scattering structure 320, and evenly transmitted outside the solid state disk 1 through the light-guiding portion 30. Therefore, the light transmitted outside the solid state disk 1 may not be too strong to hurt eyes.

In this embodiment, the light-emitting portion 212 is disposed adjacent to the light-guiding portion 30. Furthermore, the light-guiding portion 30 is formed with an incident surface 31, a scattering surface 32 having the scattering structure 320, and an exit surface 33 opposite to the scattering surface 32. The light-emitting portion 212 is disposed adjacent to the incident surface 31. The light from the light-emitting portion 212 is projected through the incident surface 31, and the light is partially scattered by the scattering structure 320 and transmitted out from the exit surface 33.

More specifically, the exit surface 33 is perpendicular to the incident surface 31. A light-transmittable portion 110 is disposed on the shell portion 11 and opposite to the exit surface 33. The light-transmittable portion 110 includes a decorative plate 111 at least partially covering the shell portion 11, and the decorative plate 111 is provided with a light-transmittable pattern portion 112. Therefore, the light scattered by the scattering structure 320 can be transmitted out from the light-transmittable pattern portion 112. Furthermore, the light-transmittable portion 110 or the light-transmittable pattern portion 112 may be a light-transmittable material layer or a hollow structure to transmit the light. Alternatively, the light-guiding portion may be embedded in the hollow structure. In other embodiments, the exit surface may not be perpendicular to the incident surface, the incident surface or the light-emitting portion may be obliquely disposed in an appropriate angle to adjust intensity of the light transmitted form the exit surface; additionally, the shell portion may not have a light-transmittable portion, the light-emitting module and the light-guiding portion may be disposed on an outer surface of the shell portion.

Figure 4:
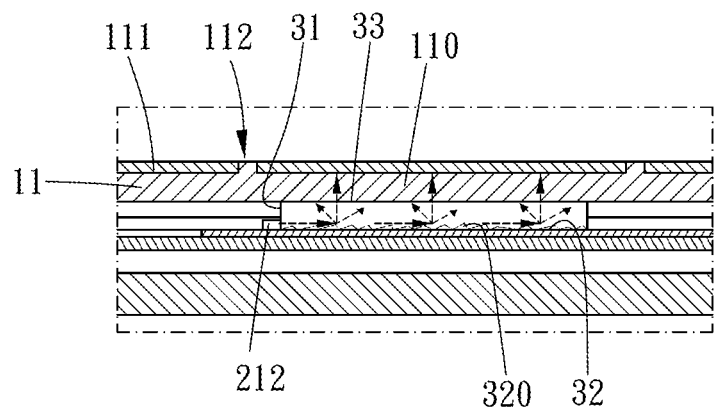
FIG. 4 is a partially-enlarged drawing of the FIG. 3 of the present invention.
Figure 4A:
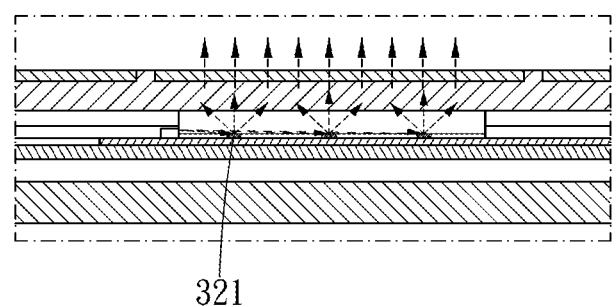
FIG. 4A is a partially-enlarged drawing of a second preferred embodiment of the present invention.

In this embodiment, the scattering structure 320 includes a concave-convex structure (or a scattering dot structure 321 as shown in FIG. 4A), so that the light from the light-emitting portion 212 can be scattered in irregular directions by the concave-convex structure and evenly transmitted outside the solid state disk 1. In other embodiment, the scattering structure may be obliquely disposed on the light-guiding portion to enable the more light be transmitted through the exit surface.

Figure 5:
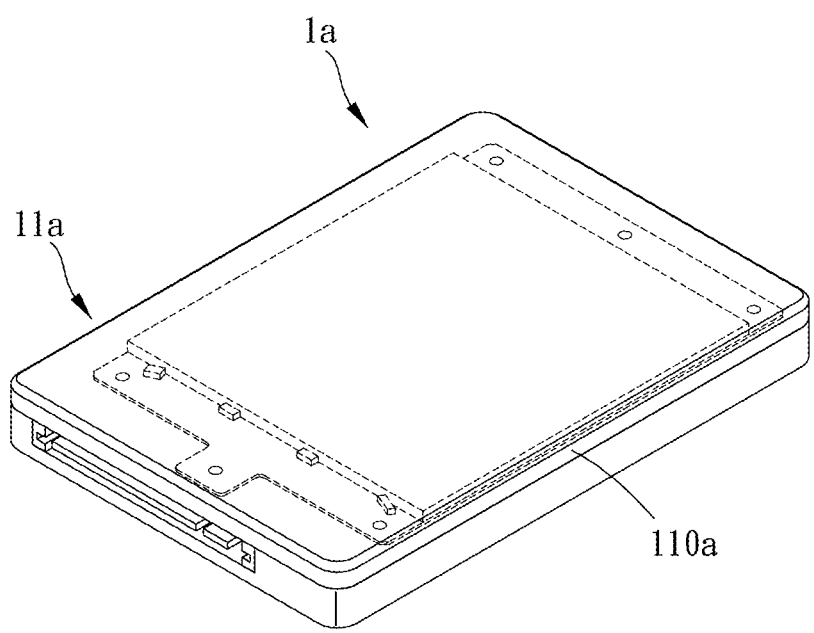
FIG. 5 is a perspective drawing of a third preferred embodiment of the present invention.
Figure 6:
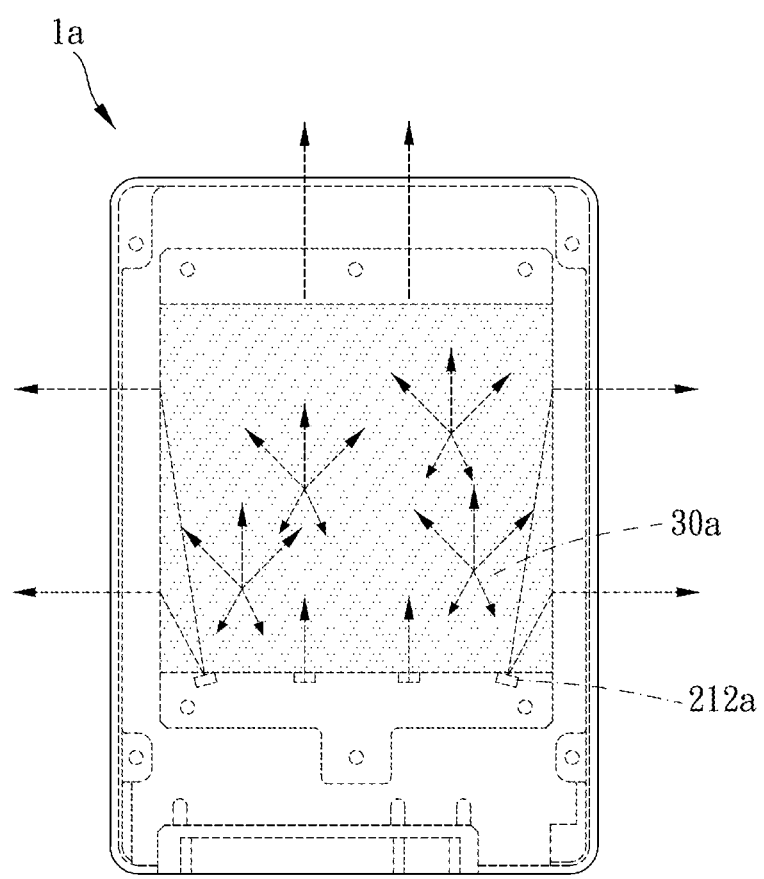
FIG. 6 is a drawing showing the third embodiment of the present invention in use.
Figure 7:
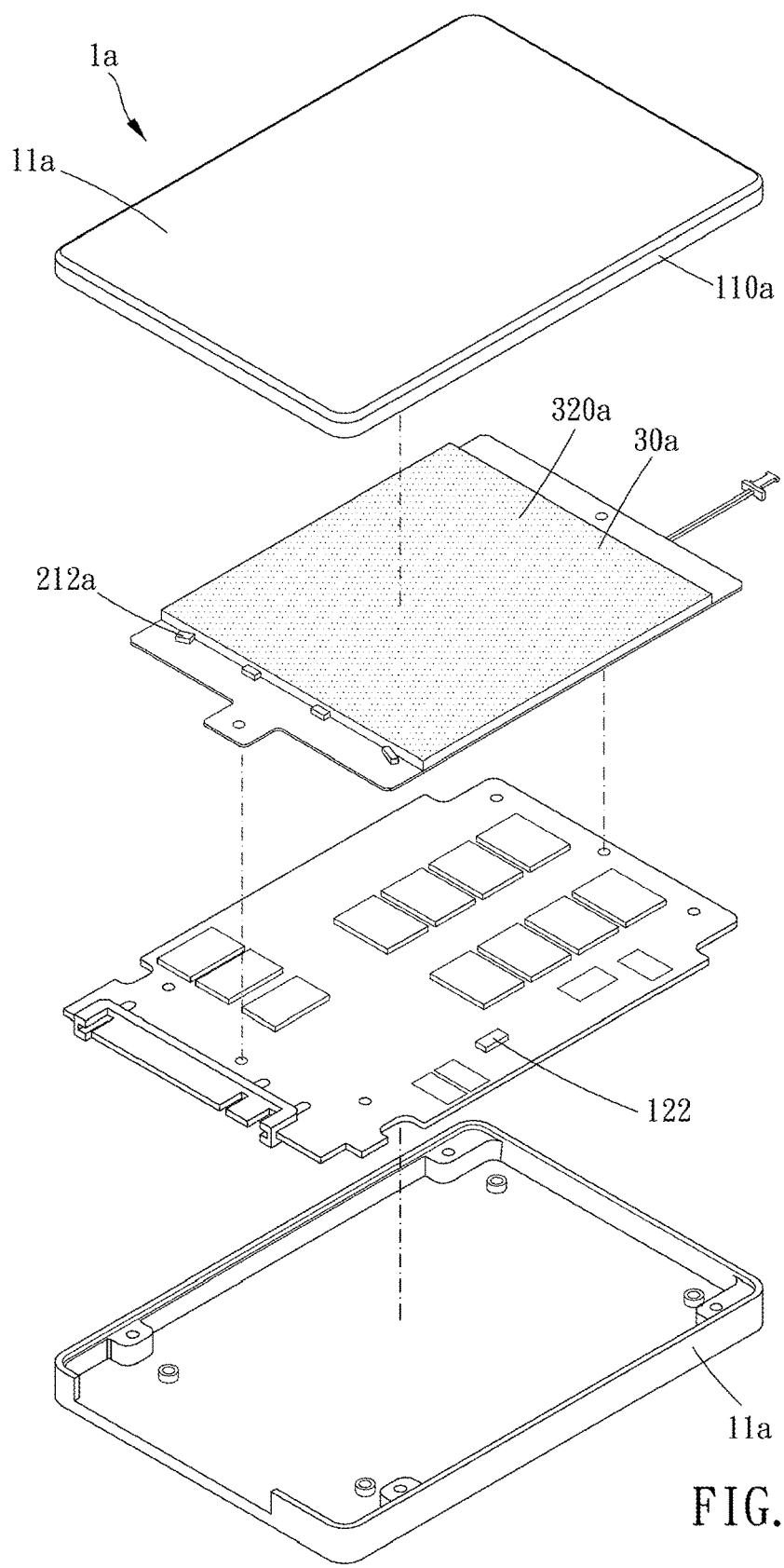
FIG. 7 is a breakdown drawing of the third preferred embodiment of the present invention.

Please refer to FIGS. 5 to 7, a solid state disk 1a of another preferred embodiment is provided. A scattering structure 320a of the solid state disk 1a is evenly distributed in the light-guiding portion 30a, and the light from the light-emitting portion 212a is partially projected onto the scattering structure 320a and evenly transmitted outside the solid state disk 1a through a circumferential side of the light-guiding portion 30a. Furthermore, the scattering structure 320a includes a plurality of scattering particles. Material of the scattering particles is different from that of the light-guiding portion 30a. Therefore, the light projected onto the scattering structure 320a can be reflected (scattered) or refracted, and evenly transmitted outside.

A circumferential side of the shell portion 11a is provided with a light-transmittable portion 110a, and the light-transmittable portion 110a is disposed corresponding to the circumferential side of the light-guiding portion 30a. Therefore, the light form the light-emitting portion 212a can be evenly transmitted to the light-transmittable portion 110a disposed on the circumferential side of the shell portion 11a through the scattering structure 320a. In other embodiment, light-guiding portion may be exposed to the circumferential side of the shell portion. In this embodiment, to provide more light to lateral sides of the light-guiding portion 30a, a part of the light-emitting portion 212a is obliquely disposed in correspondence to the light-guiding portion 30a and face to the lateral sides of the light-guiding portion 30a.

Given the above, when the light-emitting portion malfunctions, it requires only to replace the board which the light-emitting portion disposed thereon. The cost of replacement is much lower.

In addition, the board is able to provide a heat-dissipating area to prevent the substrate from being overheated.

While we have shown and described various embodiments in accordance with the present invention, it should be clear to those skilled in the art that further embodiments may be made without departing from the scope of the present invention.

What is claimed is:

1. A solid state disk, including:
   a main body, including a shell portion, a substrate disposed in the shell portion and a memory module disposed on the substrate, the substrate further having a transmit port electrically connected with the memory module;
   a light-emitting module, having a board disposed on the main body and a light-emitting portion disposed on the board;
   a light-guiding portion, disposed corresponding to the light-emitting portion, at least partial light from the light-emitting portion being transmitted outside the solid state disk through the light-guiding portion.

2. The solid state disk of claim 1, wherein the light-guiding portion has a scattering structure, and the light from the light-emitting portion is partially projected onto the scattering structure, scattered by the scattering structure, and evenly transmitted outside the solid state disk through the light-guiding portion.

3. The solid state disk of claim 1, wherein the substrate includes a first electrical slot electrically connected with the transmit port, the board includes a second electrical slot electrically connected with the light-emitting portion, and the first and second electrical slots are electrically connected through two ends of an electrical flat cable being electrically plugged thereto respectively.

4. The solid state disk of claim 2, wherein the light-guiding portion is formed with an incident surface, a scattering surface having the scattering structure, and an exit surface opposite to the scattering surface, the light-emitting portion is disposed adjacent to the incident surface, the light from the light-emitting portion is projected through the incident surface, and the light is partially scattered by the scattering surface and transmitted out from the exit surface.

5. The solid state disk of claim 4, wherein the exit surface is perpendicular to the incident surface.

6. The solid state disk of claim 4, wherein the scattering structure includes a concave-convex structure or a scattering dot structure.

7. The solid state disk of claim 4, wherein a light-transmittable portion is disposed on the shell portion and opposite to the exit surface, the light-transmittable portion includes a decorative plate at least partially covering the shell portion, and the decorative plate is provided with a light-transmittable pattern portion.

8. The solid state disk of claim 2, wherein the scattering structure is evenly distributed in the light-guiding portion, the light from the light-emitting portion is partially projected onto the scattering structure and evenly transmitted outside the solid state disk through a circumferential side of the light-guiding portion.

9. The solid state disk of claim 8, wherein a circumferential side of the shell portion is provided with a light-transmittable portion, the light-transmittable portion is disposed corresponding to the circumferential side of the light-guiding portion.

10. The solid state disk of claim 8, wherein a part of the light-emitting portion is obliquely disposed in correspondence to the light-guiding portion.

* * * * *